US012418144B1

(12) United States Patent
Baldwin et al.

(10) Patent No.: US 12,418,144 B1
(45) Date of Patent: Sep. 16, 2025

(54) GRIPPING ELECTRICAL RECEPTACLE

(71) Applicants: Jeffrey P. Baldwin, Anthem, AZ (US); Austin Steven Brown, Addison, TX (US)

(72) Inventors: Jeffrey P. Baldwin, Anthem, AZ (US); Austin Steven Brown, Addison, TX (US)

(73) Assignee: Titan3 Technology LLC, Tempe, AZ (US)

( * ) Notice: Subject to any disclaimer, the term of this patent is extended or adjusted under 35 U.S.C. 154(b) by 393 days.

(21) Appl. No.: 17/989,535

(22) Filed: Nov. 17, 2022

Related U.S. Application Data

(60) Provisional application No. 63/294,665, filed on Dec. 29, 2021.

(51) Int. Cl.
*H01R 13/639* (2006.01)
*H01R 13/512* (2006.01)
*H01R 13/629* (2006.01)

(52) U.S. Cl.
CPC ......... *H01R 13/639* (2013.01); *H01R 13/629* (2013.01); *H01R 13/512* (2013.01)

(58) Field of Classification Search
CPC H01R 13/639; H01R 13/629; H01R 13/6395; H01R 13/512
USPC ......................................... 439/372, 346, 373
See application file for complete search history.

(56) References Cited

U.S. PATENT DOCUMENTS 1,933,592 A 11/1933 Hubbell, Jr.
2,239,653 A 4/1941 O'Brien
2,524,250 A 10/1950 Bierce
3,478,297 A 11/1969 Gimpel
3,891,289 A * 6/1975 Hanke .................... H01R 13/20 439/106
4,037,901 A 7/1977 Kaszuba
4,600,258 A 7/1986 Hu
4,659,161 A 4/1987 Holcomb
4,722,693 A 2/1988 Rose
4,909,749 A 3/1990 Long
4,971,571 A * 11/1990 Puerner ................ H01R 13/627 439/372
5,277,602 A 1/1994 Yi
5,350,310 A 9/1994 Chen
5,484,299 A 1/1996 Schlessinger
5,551,884 A * 9/1996 Burkhart, Sr. ......... H01R 13/44 439/140

(Continued)

*Primary Examiner* — Gary F Paumen

(74) *Attorney, Agent, or Firm* — Kenneth C. Booth; Booth Udall, PLC

(57) ABSTRACT

An electrical receptacle with a receptacle body, at least one friction pad within the receptacle body between two plug prongs when the electrical plug is coupled with the electrical receptacle, a cam within the receptacle body and having a cam body with an oval-shaped cross section configured to force the friction pad towards a plug prong while a cam lever is in an engaged position, and release the force when the cam lever is in a disengaged position. An actuator is exposed on a surface of the receptacle body and operatively coupled to the cam lever to manually rotate the cam lever to the engaged position. When the cam lever is in the engaged position and the electrical plug is coupled with the electrical receptacle, a withdrawal force required to remove the electrical plug from the electrical receptacle is greater than when the cam lever is in the disengaged position.

15 Claims, 15 Drawing Sheets

(56) References Cited

U.S. PATENT DOCUMENTS

| | | | | |
|---|---|---|---|---|
| 5,551,893 | A | 9/1996 | Johnson | |
| 5,791,931 | A | 8/1998 | Burkhart, Sr. | |
| 5,934,931 | A | 8/1999 | Castaldo | |
| 5,967,815 | A | 10/1999 | Schlessinger | |
| 5,975,941 | A | 11/1999 | Castaldo | |
| 5,984,700 | A | 11/1999 | Chang | |
| 6,056,588 | A | 5/2000 | Castaldo | |
| 6,193,539 | B1 | 2/2001 | Chang | |
| 6,196,851 | B1 | 3/2001 | Gerard | |
| 6,224,401 | B1 | 5/2001 | Yu | |
| 6,332,794 | B1 | 12/2001 | Tzeng Jeng | |
| 6,461,176 | B1 * | 10/2002 | Haas | H01R 31/065 439/133 |
| 6,537,089 | B1 | 3/2003 | Montague | |
| 6,695,639 | B2 | 2/2004 | Castaldo | |
| 6,805,578 | B2 | 10/2004 | Chiou | |
| 6,893,275 | B2 | 5/2005 | Ng | |
| 6,984,141 | B1 | 1/2006 | Beski, Sr. | |
| 7,041,918 | B1 | 5/2006 | Wu | |
| 7,101,218 | B2 | 9/2006 | Castaldo | |
| 7,121,834 | B2 | 10/2006 | Gerard | |
| 7,125,256 | B2 | 10/2006 | Gerard | |
| 7,156,682 | B1 * | 1/2007 | Lai | H01R 13/639 439/270 |
| 7,182,615 | B1 * | 2/2007 | Liu | H01R 24/22 439/263 |
| 7,238,028 | B2 | 7/2007 | Gerard | |
| 7,381,894 | B1 | 6/2008 | Shotey | |
| 7,753,682 | B2 | 7/2010 | Gerard | |
| 7,794,283 | B2 | 9/2010 | Wang | |
| 7,902,458 | B2 | 3/2011 | Eshelman | |
| 7,931,484 | B2 | 4/2011 | Chen | |
| 7,967,620 | B1 | 6/2011 | Baldwin | |
| 8,007,283 | B2 | 8/2011 | Gerard | |
| 8,210,853 | B2 | 7/2012 | Gerard | |
| 8,344,251 | B2 | 1/2013 | Eshelman | |
| 8,475,175 | B2 | 7/2013 | Gerard | |
| 8,808,014 | B2 * | 8/2014 | Hsu | H01R 13/41 439/373 |
| 8,840,418 | B2 | 9/2014 | Chien | |
| 8,951,059 | B2 * | 2/2015 | Chang | H01R 13/633 439/346 |
| 9,450,365 | B1 * | 9/2016 | Baldwin | H01R 24/76 |
| 9,502,808 | B1 | 11/2016 | Jeffrey | |
| 9,728,908 | B1 | 8/2017 | Baldwin | |
| 9,769,620 | B1 | 9/2017 | Khider | |
| 9,905,969 | B1 * | 2/2018 | Baldwin | H01R 24/76 |
| 10,170,872 | B1 | 1/2019 | Baldwin | |
| 10,424,871 | B1 * | 9/2019 | Baldwin | H01R 13/20 |
| 10,756,495 | B1 | 8/2020 | Baldwin | |
| 10,916,899 | B1 * | 2/2021 | Baldwin | H01R 13/4538 |
| 11,011,878 | B1 * | 5/2021 | Baldwin | H01R 13/4538 |
| 2002/0068474 | A1 * | 6/2002 | Davidson | H01R 13/6392 439/346 |
| 2002/0097546 | A1 | 7/2002 | Weinberger | |
| 2008/0064248 | A1 * | 3/2008 | Huang | H01R 13/639 439/346 |
| 2010/0197156 | A1 * | 8/2010 | Chen | H01R 13/20 439/188 |
| 2014/0106601 | A1 | 4/2014 | Matsumoto | |
| 2014/0259651 | A1 | 9/2014 | Fletcher | |
| 2015/0226925 | A1 | 8/2015 | Lambourn | |
| 2018/0006403 | A1 * | 1/2018 | Dong | H01R 4/184 |
| 2018/0198235 | A1 * | 7/2018 | Huang | H01R 13/6395 |

* cited by examiner

GRIPPING ELECTRICAL RECEPTACLE

CROSS REFERENCE TO RELATED APPLICATIONS

This application claims the benefit of the filing date of U.S. Provisional Patent Application 63/294,665 entitled "GRIPPING ELECTRICAL RECEPTACLE" to Baldwin, et. al. that was filed on Dec. 29, 2021, the disclosure of which is hereby incorporated herein by this reference.

TECHNICAL FIELD

Aspects of this document relate generally to electrical receptacles, and more specifically to electrical receptacles configured to grip the plug blades.

BACKGROUND

Electrical receptacles provide power to electrical devices through the device's plug. In many instances, the plug of an electrical device easily comes free from the electrical receptacle because the plug is sized to be inserted into and removed from electrical receptacles without a significant withdrawal force. Occasionally, electrical plugs are bumped, pulled or moved to become partially removed from a receptacle, exposing live electrical prongs that become an environmental hazard through dangers such as electrical shock, electrical arc or fire. Thus, in some instances, it is desirable to have a higher withdrawal force, such as to prevent accidental removal of the plug from the electrical receptacle or to prevent young children from removing the plug from the electrical receptacle.

SUMMARY

Aspects of this document relate to an electrical receptacle comprising a receptacle body having at least two plug apertures extending into the receptacle body, wherein the at least two plug apertures are configured to receive at least two plug prongs of an electrical plug, at least two friction pads positioned within the receptacle body, wherein each friction pad of the at least two friction pads is associated with a different plug aperture of the at least two plug apertures and is positioned to sit between two plug prongs of the at least two plug prongs when the electrical plug is coupled with the electrical receptacle, a cam positioned within the receptacle body and having a cam body and a cam lever, wherein the cam body has an oval-shaped cross section and is positioned between the at least two friction pads and is configured to force the at least two friction pads towards the at least two plug prongs while the electrical plug is coupled with the electrical receptacle and the cam lever is in an engaged position and release the at least two friction pads when the cam lever is in a disengaged position rotated away from the engaged position, and an actuator exposed on a surface of the receptacle body and operatively coupled to the cam lever, wherein the actuator is configured to enable a user to manually rotate the cam lever to the engaged position, wherein, when the cam lever is in the engaged position and the electrical plug is coupled with the electrical receptacle, a withdrawal force required to remove the electrical plug from the electrical receptacle is greater than when the cam lever is in the disengaged position.

Particular embodiments may comprise one or more of the following features. The actuator may have a plurality of ridges configured to facilitate rotating the actuator. The actuator may be a dial surrounding the at least two plug apertures of the receptacle body. The withdrawal force may be between 15 lbs and 50 lbs when the cam lever is in the engaged position.

According to an aspect of the disclosure, an electrical receptacle may comprise a receptacle body having at least two plug apertures extending into the receptacle body, wherein the at least two plug apertures are configured to receive at least two plug prongs of an electrical plug, at least two friction pads positioned within the receptacle body, wherein each friction pad of the at least two friction pads is associated with a different plug aperture of the at least two plug apertures, and a cam positioned within the receptacle body and having a cam body and a cam lever, wherein the cam body is positioned between the at least two friction pads and is configured to force the at least two friction pads towards the at least two plug prongs while the electrical plug is coupled with the electrical receptacle and the cam lever is in an engaged position, wherein, when the cam lever is in the engaged position and the electrical plug is coupled with the electrical receptacle, a withdrawal force required to remove the electrical plug from the electrical receptacle is greater than when the cam lever is in a disengaged position rotated away from the engaged position.

Particular embodiments may comprise one or more of the following features. The at least two friction pads may be positioned to sit between two plug prongs of the at least two plug prongs when the electrical plug is coupled with the electrical receptacle. The cam body may comprise an oval-shaped cross section. An actuator may be exposed on a surface of the receptacle body and operatively coupled to the cam lever, wherein the actuator is configured to enable a user to manually rotate the cam lever to the engaged position. The actuator may include a plurality of ridges configured to facilitate rotating the actuator. The actuator may be a dial surrounding the at least two plug apertures of the receptacle body. The withdrawal force may be between 15 lbs and 50 lbs when the cam lever is in the engaged position.

According to an aspect of the disclosure, an electrical receptacle may comprise a receptacle body having at least two plug apertures extending into the receptacle body, wherein the at least two plug apertures are configured to receive at least two plug prongs of an electrical plug, and a cam positioned within the receptacle body and having a cam body, wherein the cam body is configured to apply a force to the at least two plug prongs while the electrical plug is coupled with the electrical receptacle and the cam is in an engaged position, wherein, when the cam is in the engaged position and the electrical plug is coupled with the electrical receptacle, a withdrawal force required to remove the electrical plug from the electrical receptacle is greater than when the cam is in a disengaged position rotated away from the engaged position.

Particular embodiments may comprise one or more of the following features. At least two friction pads positioned within the receptacle body, wherein each friction pad of the at least two friction pads is associated with a different plug aperture of the at least two plug apertures. The cam body may be positioned between the at least two friction pads and is configured to force the at least two friction pads towards the at least two plug prongs while the electrical plug is coupled with the electrical receptacle and the cam lever is in an engaged position. The at least two friction pads may be positioned to sit between two plug prongs of the at least two plug prongs when the electrical plug is coupled with the electrical receptacle. The cam body may be positioned between the at least two plug prongs when the electrical plug is coupled with the electrical receptacle. An actuator may be exposed on a surface of the receptacle body and operatively coupled to the cam, wherein the actuator is configured to enable a user to manually rotate the cam to the engaged position. The actuator may include a plurality of ridges configured to facilitate rotating the actuator. The actuator may be a dial surrounding the at least two plug apertures of the receptacle body. The withdrawal force may be between 15 lbs and 50 lbs when the cam is in the engaged position.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
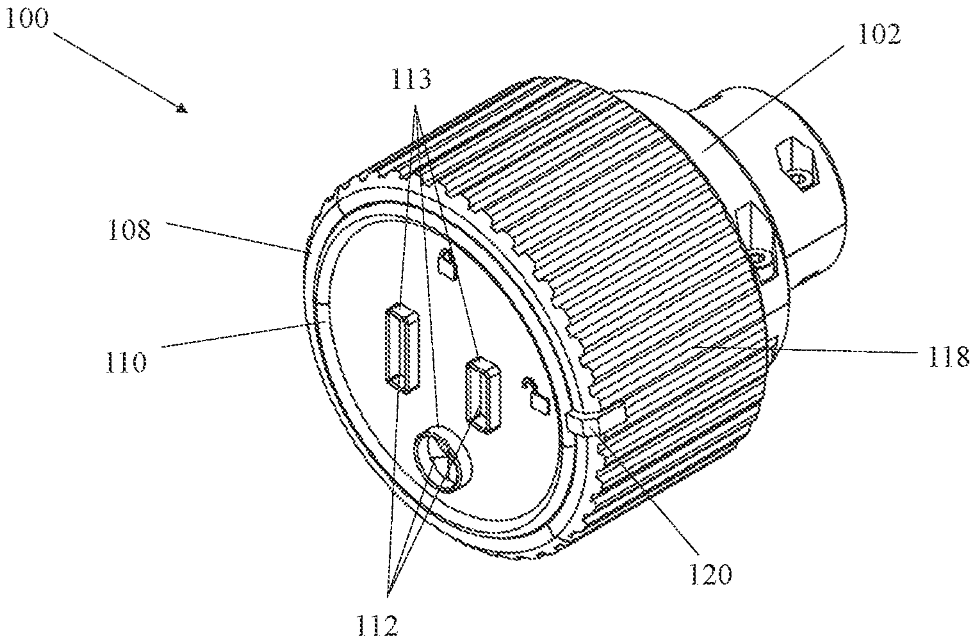
FIG. 1 is a perspective view of the gripping electrical receptacle.
Figure 2:
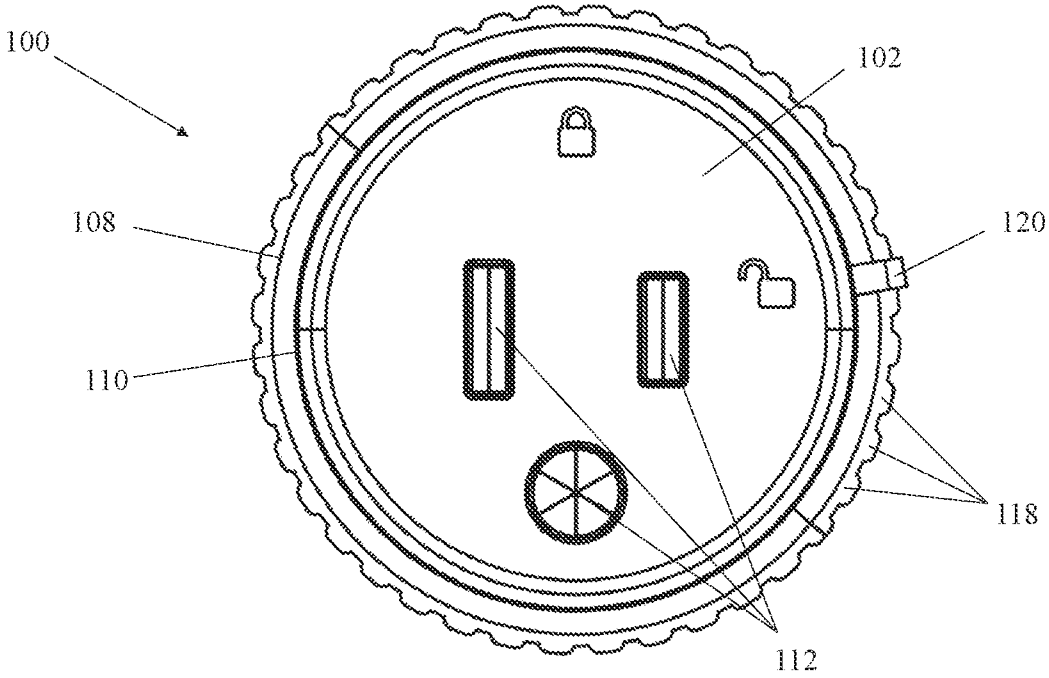
FIG. 2 is a front view of the gripping electrical receptacle shown in FIG. 1.
Figure 3:
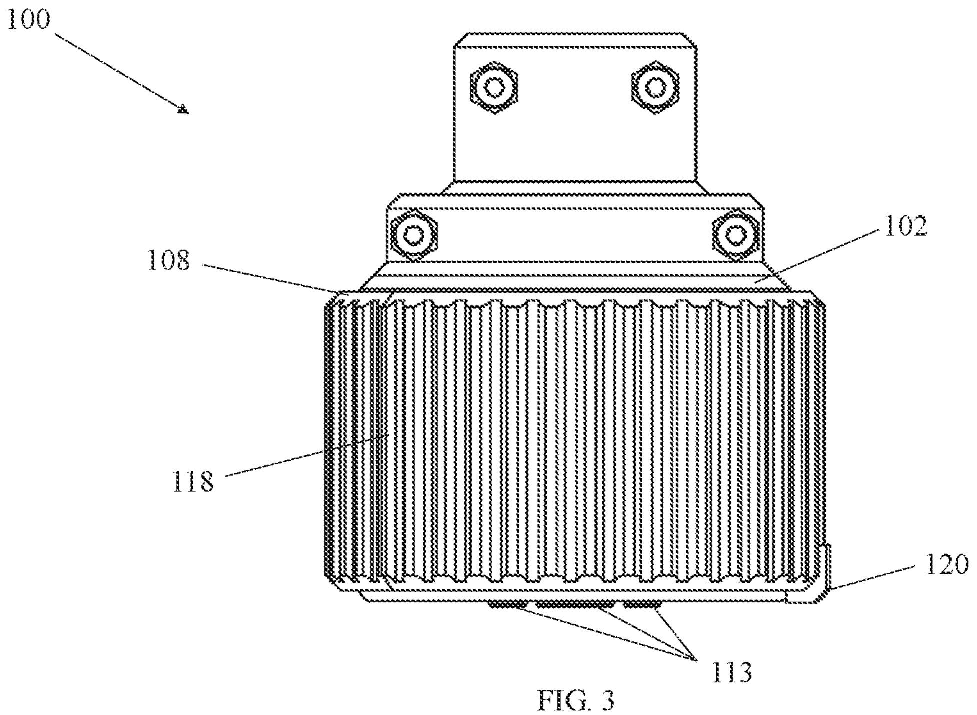
FIG. 3 is a top view of the gripping electrical receptacle shown in FIG. 1.
Figure 4:
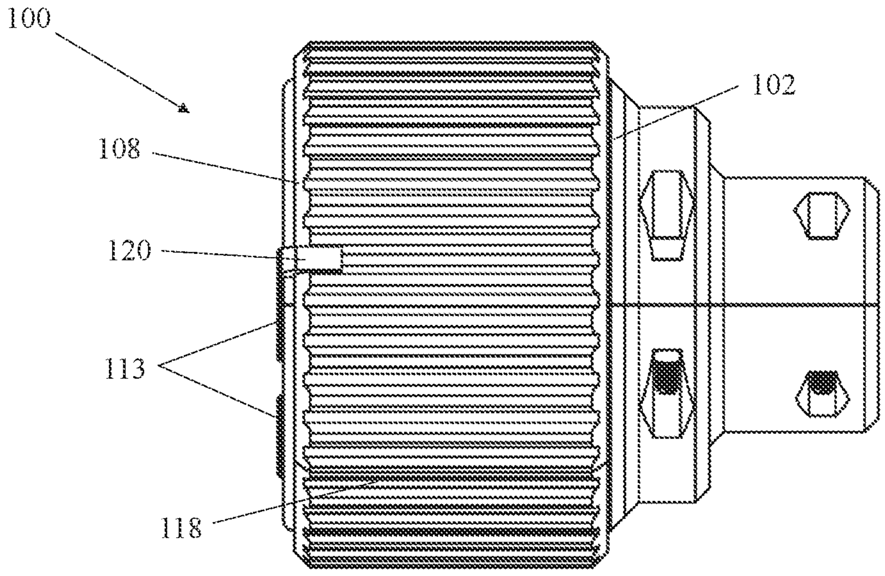
FIG. 4 is a right-side view of the gripping electrical receptacle shown in FIG. 1.
Figure 5:
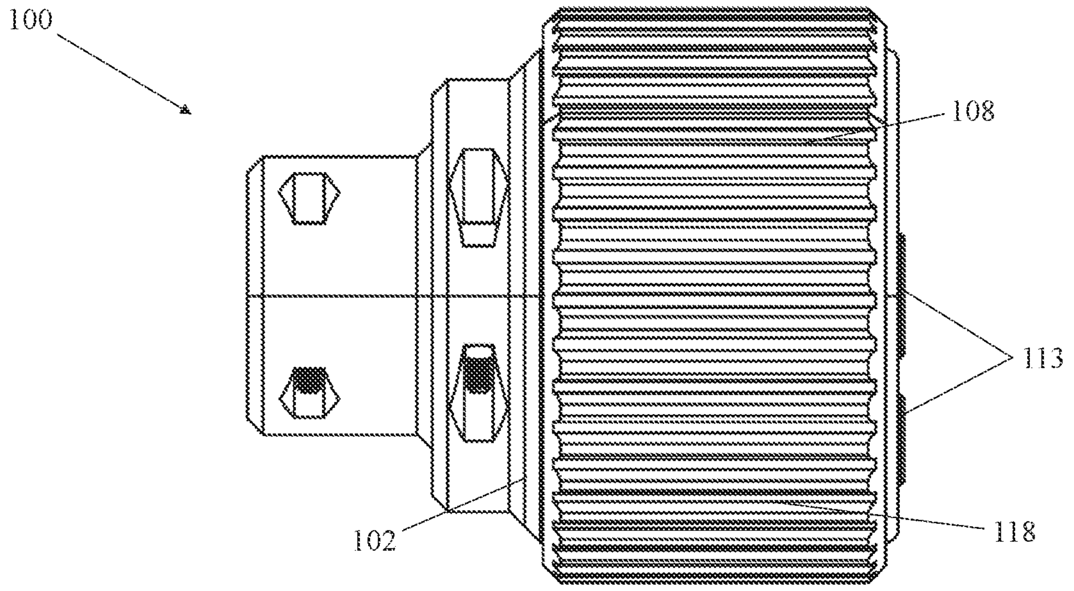
FIG. 5 is a left-side view of the gripping electrical receptacle shown in FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure is related to a gripping electrical receptacle 100, illustrated in FIGS. 1-6. The electrical receptacle 100 is configured to selectively grip an electrical plug 10 that is coupled with the electrical receptacle 100. When in an engaged configuration, the electrical receptacle 100 increases a withdrawal force required to remove the electrical plug 10 from the electrical receptacle 100 as compared to the withdrawal force required when the electrical receptacle 100 is in a disengaged configuration. Instead of locking the electrical plug 10 in the electrical receptacle 100, the electrical receptacle 100 creates a frictional force that increases the withdrawal force required to remove the electrical plug 10 from the electrical receptacle 100. Although the drawings illustrate a particular embodiment of the electrical receptacle 100, it will be clear to one of skill in the art that the electrical receptacle 100 disclosed herein can be applied to any NEMA (National Electrical Manufacturer's Association) receptacle to increase the withdrawal force required and reduce the likelihood of a plug coming unintentionally loosened from an electrical receptacle.

Figure 6:
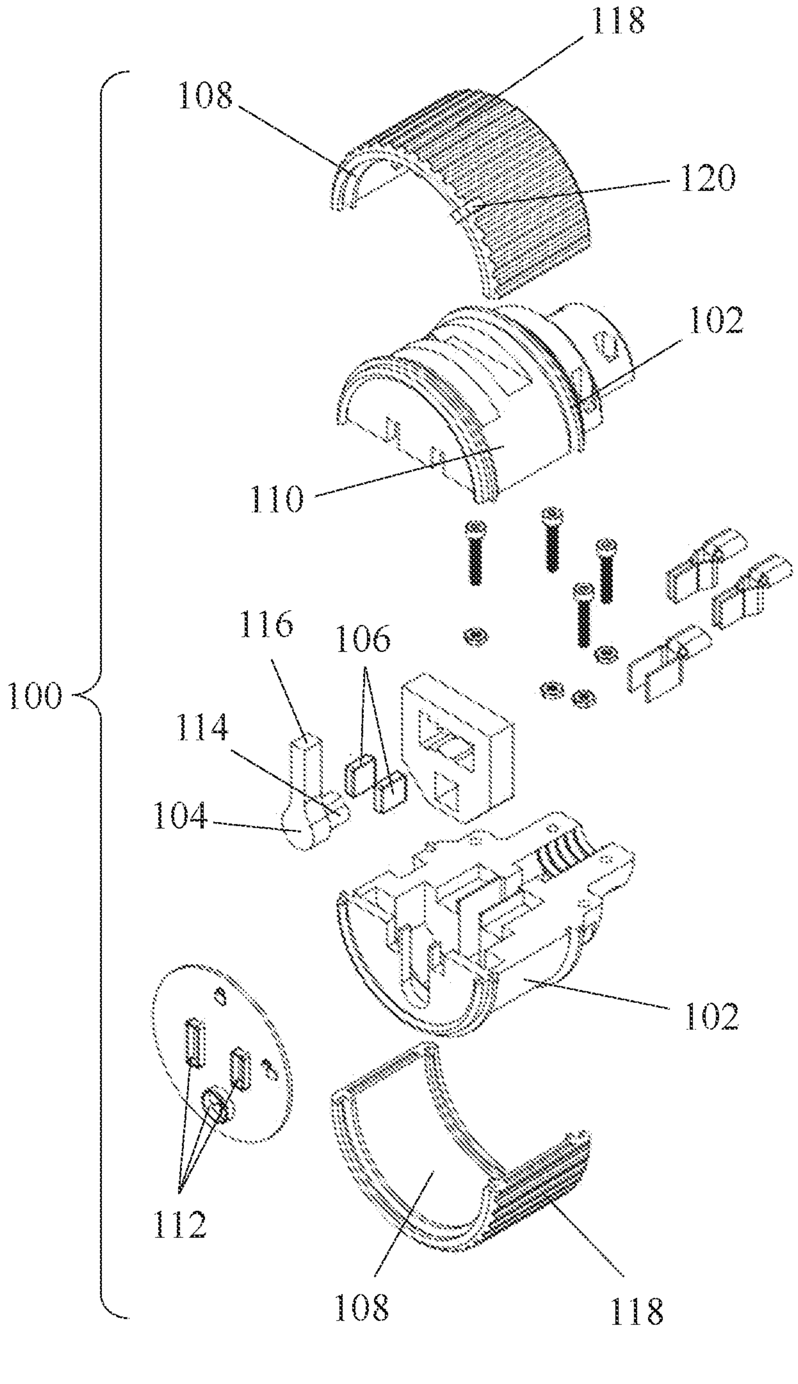
FIG. 6 is an exploded view of the gripping electrical receptacle shown in FIG. 1.

In specific relation to FIG. 6, the electrical receptacle 100 has a receptacle body 102 and a cam 104 positioned within the receptacle body 102. The electrical receptacle 100 may also have friction pads 106 positioned within the receptacle body 102 and an actuator 108 exposed on a surface 110 of the receptacle body 102. The receptacle body 102 has at least two plug apertures 112 extending into the receptacle body 102. In some embodiments, the receptacle body 102 has three plug apertures 112 extending into the receptacle body 102. The plug apertures 112 are configured to receive the plug prongs 12 of the electrical plug 10. When the plug prongs 12 of the electrical plug 10 are coupled with the plug apertures 112 of the receptacle body 102, the electrical receptacle 100 is configured to provide electrical power to the electrical plug 10. The plug apertures 112 may each include a raised border 113 surrounding the plug aperture 112. When the electrical plug 10 is coupled with the electrical receptacle 100, the raised border 113 of each plug aperture 112 may compress against the electrical plug 10 and may be configured to restrict the intrusion of water into the receptacle body 102, thus reducing the chance of an electrical short or shock.

Figure 7A:
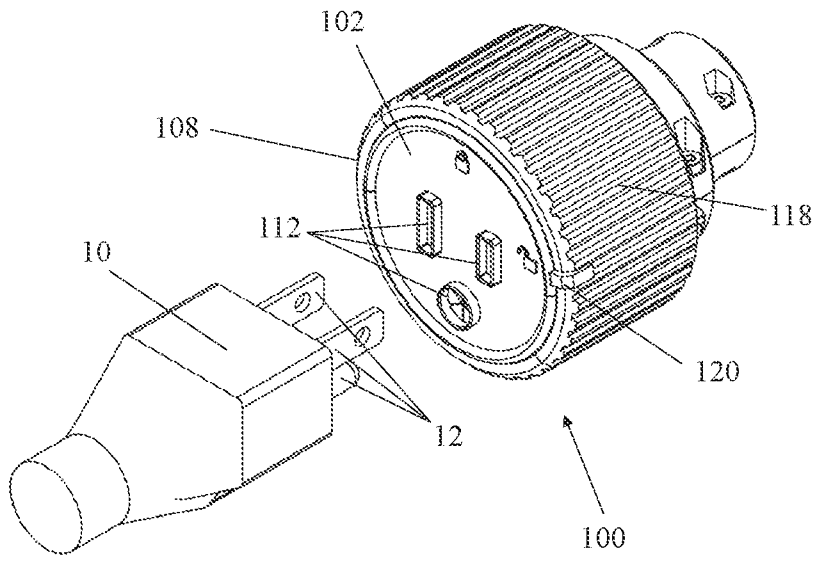
FIG. 7A is a perspective view of the gripping electrical receptacle shown in FIG. 1 with an electrical plug removed and the cam in the disengaged position.
Figure 7B:
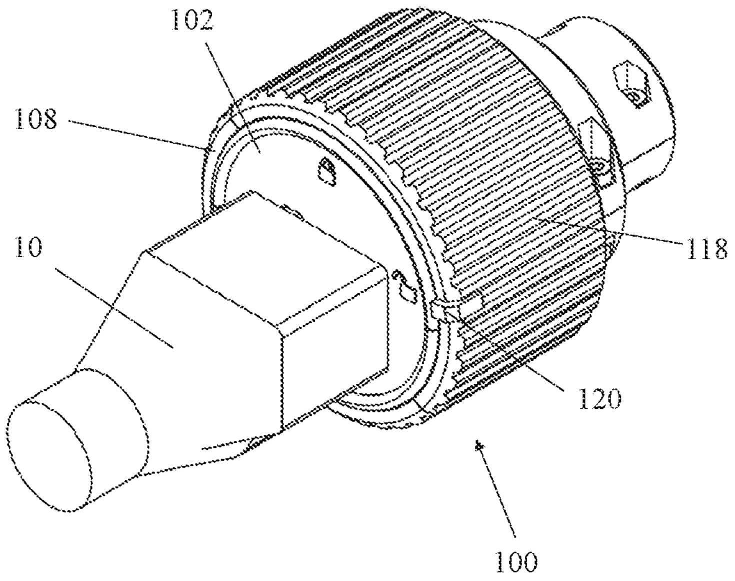
FIG. 7B is a perspective view of the gripping electrical receptacle shown in FIG. 7A with the plug coupled with the electrical receptacle and the cam in the disengaged position.
Figure 7C:
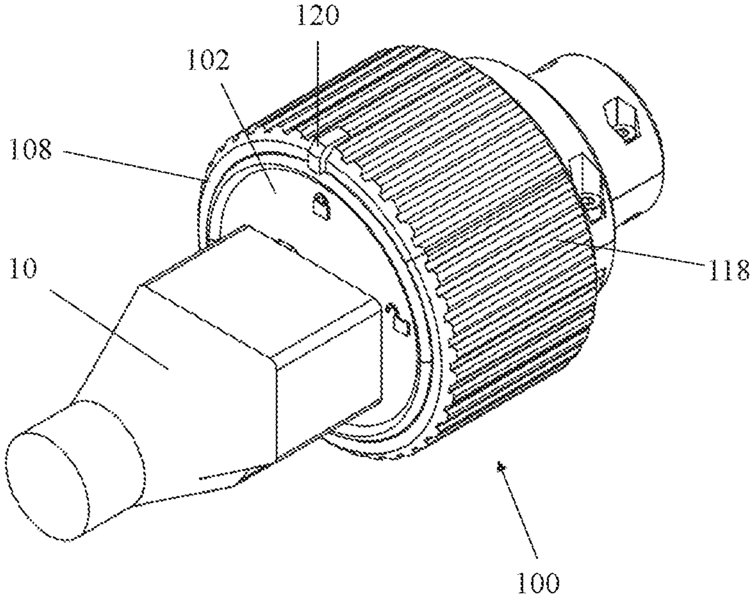
FIG. 7C is perspective view of the gripping electrical receptacle shown in FIG. 7A with the plug coupled with the electrical receptacle and the cam in the engaged position.

As mentioned above, the cam 104 is positioned within the receptacle body 102. The cam 104 is movable between an engaged position and a disengaged position. FIGS. 7A-7C illustrate the progression of plugging in the electrical plug 10 and then moving the cam 104 to the engaged position. When the cam 104 is in the engaged position and the electrical plug 10 is coupled with the electrical receptacle 100, a withdrawal force required to move the electrical plug 10 from the electrical receptacle 100 is greater than when the cam 104 is in the disengaged position. When the cam 104 is in the engaged position, the likelihood of the electrical plug 10 coming unintentionally loosened from the electrical receptacle 100 is reduced. The withdrawal force may be between 15 lbs and 30 lbs. In some embodiments, the withdrawal force may be as high as 50 lbs or between 15 lbs and 50 lbs. In some embodiments, the cam 104 is configured to rotate between the engaged position and the disengaged position. The cam 104 has a cam body 114 which is configured to apply a force to the plug prongs 12 when the electrical plug 10 is coupled with the electrical receptacle 100 and the cam 104 is in an engaged position. By applying a force to the plug prongs 12, the cam 104 increases a frictional force between the plug prongs 12 and the electrical receptacle 100, thus increasing the withdrawal force.

Figure 8A:
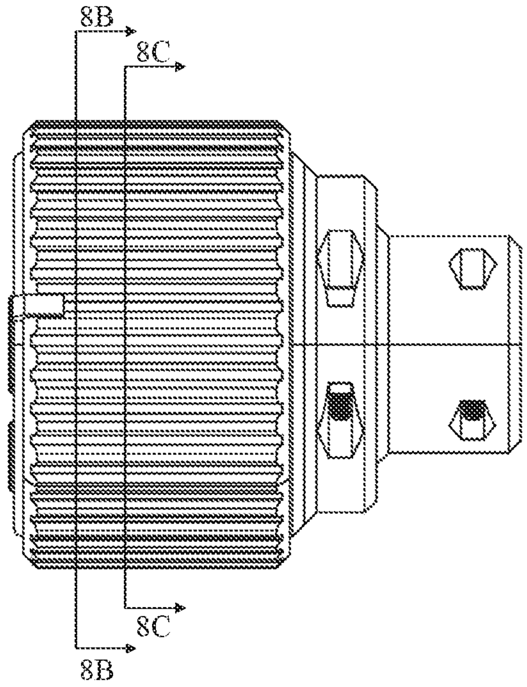
FIG. 8A is a side view of the gripping electrical receptacle shown in FIG. 1 with the cam in the disengaged position.
Figure 8B:
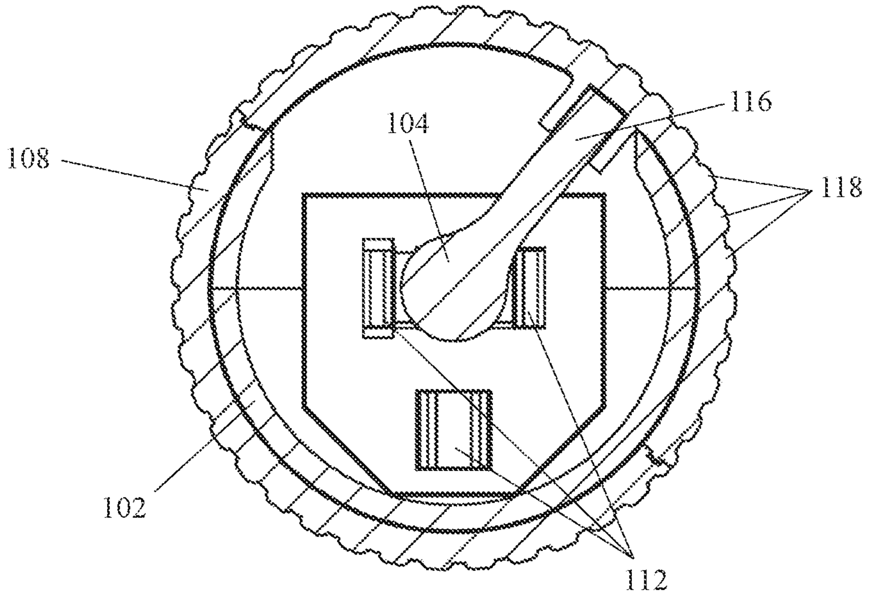
FIG. 8B is a cross section of the gripping electrical receptacle taken along line 8B-8B in FIG. 8A.
Figure 8C:
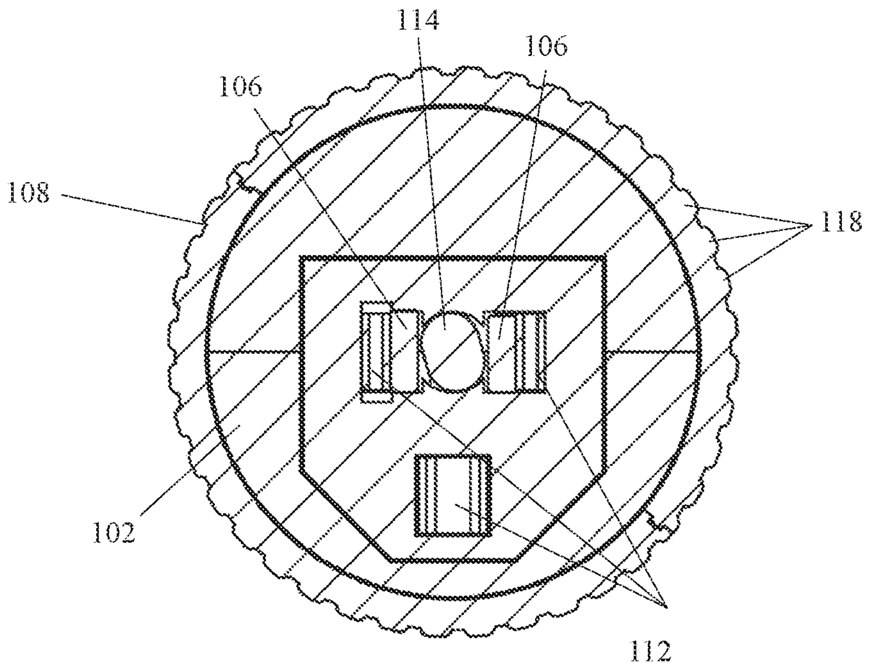
FIG. 8C is a cross section of the gripping electrical receptacle taken along line 8C-8C in FIG. 8A.
Figure 9A:
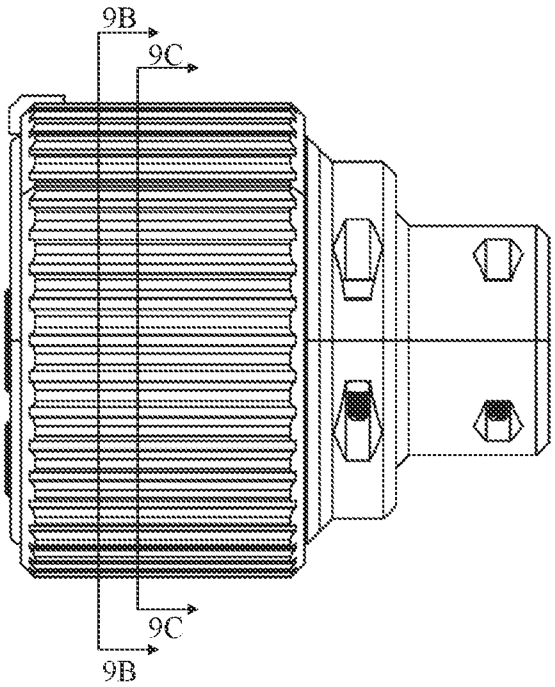
FIG. 9A is a side view of the gripping electrical receptacle shown in FIG. 1 with the cam in the engaged position.
Figure 9B:
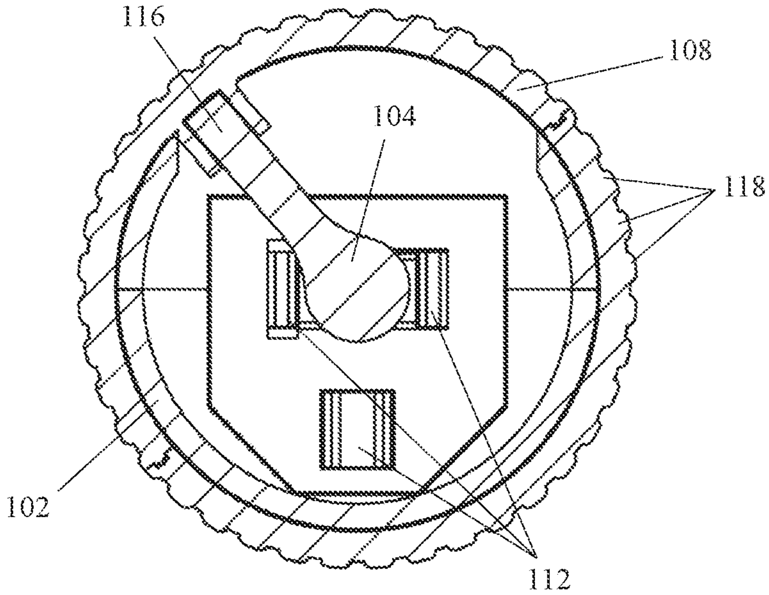
FIG. 9B is a cross section of the gripping electrical receptacle taken along line 9B-9B in FIG. 9A.
Figure 9C:
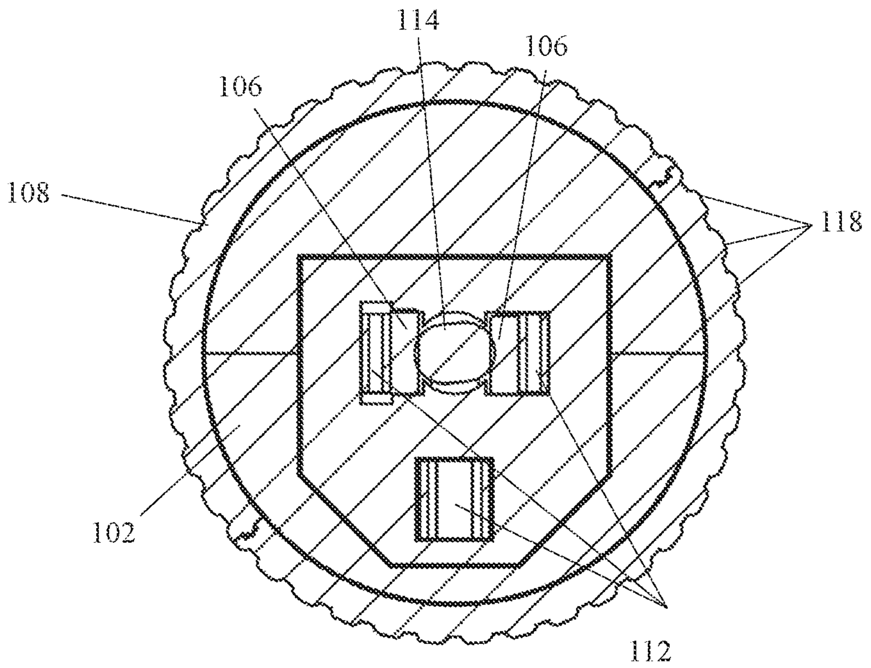
FIG. 9C is a cross section of the gripping electrical receptacle taken along line 9C-9C in FIG. 9A.

FIGS. 8A-9C illustrate the internal components of the electrical receptacle 100 when the cam 104 is in the disengaged position (FIGS. 8A-8C) and in the engaged position (FIGS. 9A-9C). The cam body 114 may apply the force directly to the plug prongs 12, or indirectly through other components. For example, the friction pads 106 may be positioned between the cam body 114 and the plug prongs 12 when the electrical plug 10 is coupled with the electrical receptacle 100. In such an embodiment, when the cam 104 is moved to the engaged position, the cam body 114 exerts a force on the friction pads 106, pushing the friction pads 106 against the plug prongs 12 and creating the frictional force discussed above. Each friction pad 106 may be associated with a different plug aperture 112, positioned to contact a different plug prong 12 when the cam 104 is moved to the engaged position. Thus, similar to the plug apertures 112, the friction pads 106 may be at least two friction pads 106. Each friction pad 106 may be positioned to sit between two plug prongs 12 when the electrical plug 10 is coupled with the electrical receptacle 100. In embodiments of the electrical receptacle 100 with friction pads 106, the cam body 114 may be configured to force the friction pads 106 towards the plug prongs 12 while the electrical plug 10 is coupled with the electrical receptacle 100 and the cam 104 is in the engaged position as shown in FIG. 9C. Similarly, the cam body 114 may be configured to release the friction pads 106 when the cam 104 is in the disengaged position, as shown in FIG. 8C. The friction pads 106 may be formed of a material that is selected for creating higher frictional forces with other materials. For example, the friction pads 106 may be formed of a rubber material, a plastic material, or a silicon material. Other contemplated materials include Delrin®, Teflon®, and vinyl. The material used for the friction pads 106 may have a durometer measurement within the range of Shore A 20 to Shore C 70.

The cam body 114 may have an oval-shaped cross section and may be positioned between the plug prongs 12 of the electrical plug 10. As shown in FIG. 8C, when the cam body 114 is in the disengaged position, the cam body 114 may fit between the plug prongs 12 without making significant contact with the plug prongs 12 or any component positioned between the plug prongs 12 and the cam body 114, such as the friction pads 106. However, when the cam body 114 is moved to the engaged position, the size of the cam body 114 is larger along the line between the plug prongs 12 due to the oval shape of the cam body 114, as shown in FIG. 9C, thus increasing the contact between the cam body 114 and the plug prongs 12 or any component positioned between the plug prongs 12 and the cam body 114. This increased contact is what creates the frictional force discussed above.

The cam 104 may also have a cam lever 116 extending away from the cam body 114. The cam lever 116 is configured to facilitate moving the cam 104 between the engaged position and the disengaged position (see FIGS. 8B and 9B). In some embodiments, the cam lever 116 is accessible to the user to manually move the cam 104 between the engaged position and the disengaged position. In some embodiments, the cam lever 116 is operatively coupled with the actuator 108 (see FIGS. 8B and 9B). As mentioned above, the actuator 108 is exposed on the surface 110 of the receptacle body 102. The surface 110 may be a front surface, a top surface, a bottom surface, or a side surface of the electrical receptacle 100. Thus, even in embodiments in which the cam lever 116 is not directly accessible to the user, the actuator 108 allows the user to manually rotate the cam lever 116 between the engaged position and the disengaged position.

The actuator 108 may have a plurality of ridges 118 that are configured to facilitate rotating the actuator 108 by improving the grip of the user on the actuator 108. In some embodiments, the actuator 108 is formed as a dial surrounding the plug apertures 112 of the receptacle body 102. In embodiments of the electrical receptacle 100 that are positioned on the end of a power cord, the actuator 108 may extend around a circumference of the electrical receptacle 100. In embodiments that are on a wall plate, the actuator 108 may be positioned on a front surface of the wall plate and allow the user to manually adjust the cam 104 through the front surface of the wall plate. Thus, the actuator 108 may be adapted to different embodiments of the electrical receptacle 100 while still serving the same purpose. The actuator 108 may include a position indicator 120 that is configured to provide a visual indication of whether the cam 104 is in the engaged position or in the disengaged position. Thus, the user can easily see the current position of the cam 104, and thus rotate the actuator 108 to move the cam 104 between the engaged position and the disengaged position as desired. The actuator 108 may also be configured to produce audible or tactical feedback to indicate when the cam 104 has moved from the engaged position to the disengaged position or vice versa.

All of the specific examples and embodiments of the components illustrated herein are intended to be non-limiting examples of a particular way of forming the electrical receptacle 100. Other components, materials, shapes, sizes, and the like may be used and would be needed when applying this disclosure to other receptacles and other designs, as will be apparent to one of skill in the art.

It will be understood that implementations of a gripping electrical receptacle are not limited to the specific assemblies, devices and components disclosed in this document, as virtually any assemblies, devices and components consistent with the intended operation of a gripping electrical receptacle may be used. Accordingly, for example, although particular gripping electrical receptacles, and other assemblies, devices and components are disclosed, such may include any shape, size, style, type, model, version, class, measurement, concentration, material, weight, quantity, and/or the like consistent with the intended operation of gripping electrical receptacles. Implementations are not limited to uses of any specific assemblies, devices and components; provided that the assemblies, devices and components selected are consistent with the intended operation of a gripping electrical receptacle.

Accordingly, the components defining any gripping electrical receptacle may be formed of any of many different types of materials or combinations thereof that can readily be formed into shaped objects provided that the materials selected are consistent with the intended operation of a gripping electrical receptacle. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various gripping electrical receptacles may be manufactured using conventional procedures as added to and improved upon through the procedures described here. Some components defining a gripping electrical receptacle may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling gripping electrical receptacles are not limited to the specific order of steps as disclosed in this document. Any steps or sequence of steps of the assembly of a gripping electrical receptacle indicated herein are given as examples of possible steps or sequence of steps and not as limitations, since various assembly processes and sequences of steps may be used to assemble gripping electrical receptacles.

The implementations of a gripping electrical receptacle described are by way of example or explanation and not by way of limitation. Rather, any description relating to the foregoing is for the exemplary purposes of this disclosure, and implementations may also be used with similar results for a variety of other applications employing a gripping electrical receptacle.

What is claimed is:

1. An electrical receptacle, comprising:

a receptacle body having at least two plug apertures extending into the receptacle body, wherein the at least two plug apertures are configured to receive at least two plug prongs of an electrical plug;

at least two friction pads positioned within the receptacle body, wherein each friction pad of the at least two friction pads is associated with a different plug aperture of the at least two plug apertures and is positioned to sit between two plug prongs of the at least two plug prongs when the electrical plug is coupled with the electrical receptacle;

a cam positioned within the receptacle body and having a cam body and a cam lever, wherein the cam body has an oval-shaped cross section and is positioned between the at least two friction pads and is configured to force the at least two friction pads towards the at least two plug prongs while the electrical plug is coupled with the electrical receptacle and the cam lever is in an engaged position and release the at least two friction pads when the cam lever is in a disengaged position rotated away from the engaged position; and an actuator exposed on a surface of the receptacle body and operatively coupled to the cam lever, wherein the actuator is configured to enable a user to manually rotate the cam lever to the engaged position and wherein the actuator is a dial surrounding the at least two plug apertures of the receptacle body;

wherein, when the cam lever is in the engaged position and the electrical plug is coupled with the electrical receptacle, a withdrawal force required to remove the electrical plug from the electrical receptacle is greater than when the cam lever is in the disengaged position.

2. The electrical receptacle of claim 1, wherein the actuator has a plurality of ridges configured to facilitate rotating the actuator.

3. The electrical receptacle of claim 1, wherein the withdrawal force is between 15 lbs and 50 lbs when the cam lever is in the engaged position.

4. An electrical receptacle, comprising:

a receptacle body having at least two plug apertures extending into the receptacle body, wherein the at least two plug apertures are configured to receive at least two plug prongs of an electrical plug;

at least two friction pads positioned within the receptacle body, wherein each friction pad of the at least two friction pads is associated with a different plug aperture of the at least two plug apertures;

a cam positioned within the receptacle body and having a cam body and a cam lever, wherein the cam body is positioned between the at least two friction pads and is configured to force the at least two friction pads towards the at least two plug prongs while the electrical plug is coupled with the electrical receptacle and the cam lever is in an engaged position; and an actuator exposed on a surface of the receptacle body and operatively coupled to the cam lever, wherein the actuator is configured to enable a user to manually rotate the cam lever to the engaged position, wherein the actuator is a dial surrounding the at least two plug apertures of the receptacle body;

wherein, when the cam lever is in the engaged position and the electrical plug is coupled with the electrical receptacle, a withdrawal force required to remove the electrical plug from the electrical receptacle is greater than when the cam lever is in a disengaged position rotated away from the engaged position.

5. The electrical receptacle of claim 4, wherein the at least two friction pads are positioned to sit between two plug prongs of the at least two plug prongs when the electrical plug is coupled with the electrical receptacle.

6. The electrical receptacle of claim 4, wherein the cam body has an oval-shaped cross section.

7. The electrical receptacle of claim 4, wherein the actuator has a plurality of ridges configured to facilitate rotating the actuator.

8. The electrical receptacle of claim 4, wherein the withdrawal force is between 15 lbs and 50 lbs when the cam lever is in the engaged position.

9. An electrical receptacle, comprising:

a receptacle body having at least two plug apertures extending into the receptacle body, wherein the at least two plug apertures are configured to receive at least two plug prongs of an electrical plug;

a cam positioned within the receptacle body and having a cam body, wherein the cam body is configured to apply a force to the at least two plug prongs while the electrical plug is coupled with the electrical receptacle and the cam is in an engaged position; and an actuator exposed on a surface of the receptacle body and operatively coupled to the cam, wherein the actuator is configured to enable a user to manually rotate the cam to the engaged position, wherein the actuator is a dial surrounding the at least two plug apertures of the receptacle body;

wherein, when the cam is in the engaged position and the electrical plug is coupled with the electrical receptacle, a withdrawal force required to remove the electrical plug from the electrical receptacle is greater than when the cam is in a disengaged position rotated away from the engaged position.

10. The electrical receptacle of claim 9, further comprising at least two friction pads positioned within the receptacle body, wherein each friction pad of the at least two friction pads is associated with a different plug aperture of the at least two plug apertures.

11. The electrical receptacle of claim 10, wherein the cam body is positioned between the at least two friction pads and is configured to force the at least two friction pads towards the at least two plug prongs while the electrical plug is coupled with the electrical receptacle and the cam lever is in an engaged position.

12. The electrical receptacle of claim 10, wherein the at least two friction pads are positioned to sit between two plug prongs of the at least two plug prongs when the electrical plug is coupled with the electrical receptacle.

13. The electrical receptacle of claim 9, wherein the cam body is positioned between the at least two plug prongs when the electrical plug is coupled with the electrical receptacle.

14. The electrical receptacle of claim 9, wherein the actuator has a plurality of ridges configured to facilitate rotating the actuator.

15. The electrical receptacle of claim 9, wherein the withdrawal force is between 15 lbs and 50 lbs when the cam is in the engaged position.

* * * * *